US006597686B1

(12) United States Patent
Smyk

(10) Patent No.: US 6,597,686 B1
(45) Date of Patent: *Jul. 22, 2003

(54) APPARATUS AND METHOD FOR INTERNET TELEPHONY ROUTING

(75) Inventor: Darek A. Smyk, Piscataway, NJ (US)

(73) Assignee: Telcordia Technologies, Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,684

(22) Filed: Apr. 21, 1998

Related U.S. Application Data

(60) Provisional application No. 60/044,143, filed on Apr. 22, 1997.

(51) Int. Cl.[7] .............................................. H04L 12/66
(52) U.S. Cl. ...................... 370/352; 370/401; 370/252
(58) Field of Search ............................... 370/217, 218, 370/232, 236, 237, 238, 352–356, 389, 912, 400, 401, 252; 379/221

(56) References Cited

U.S. PATENT DOCUMENTS

| | | | |
|---|---|---|---|
| 4,771,425 A | 9/1988 | Baran et al. | 370/85 |
| 5,095,480 A | 3/1992 | Fenner | 370/94.1 |
| 5,712,907 A | 1/1998 | Wegner et al. | 379/112 |
| 5,724,412 A | 3/1998 | Srinivasan | 379/93.23 |
| 5,751,706 A | 5/1998 | Land et al. | 370/352 |
| 6,064,653 A * | 5/2000 | Farris | 370/237 |
| 6,069,890 A * | 5/2000 | White et al. | 370/352 |
| 6,128,379 A * | 10/2000 | Smyk | 379/230 |
| 6,137,792 A * | 10/2000 | Jonas et al. | 370/354 |
| 6,154,445 A * | 11/2000 | Farris et al. | 370/237 |
| 6,205,135 B1 * | 3/2001 | Chinni et al. | 370/356 |

FOREIGN PATENT DOCUMENTS

JP    10-178503    6/1998

OTHER PUBLICATIONS

Yang, C., INETPhone: Telephone Services and Servers on Internet, RFC 1789, Apr. 1995, pp. 1–6.

* cited by examiner

*Primary Examiner*—Hassan Kizou
*Assistant Examiner*—John Pezzlo
(74) *Attorney, Agent, or Firm*—Joseph Giordano; James W. Falk

(57) ABSTRACT

An apparatus and method for automatically designating a telephone call route through a telephone network including a circuit switched telephone network (STN) and a packet switched network, such as the Internet. The method includes the steps, executed by a network element, of receiving a telephone number corresponding to a called party receiving the telephone call, reviewing preference information pertaining to a calling party's telephone service, determining from the preference information and the telephone number whether the telephone call can be routed to the called party through the packet switched network, and assigning a route for the telephone call through one of either the packet switched network or the STN to the called party based on whether the call is routable through the packet switched network. A network element (NE) includes the databases and call processing records necessary to route a call and perform these steps.

6 Claims, 9 Drawing Sheets

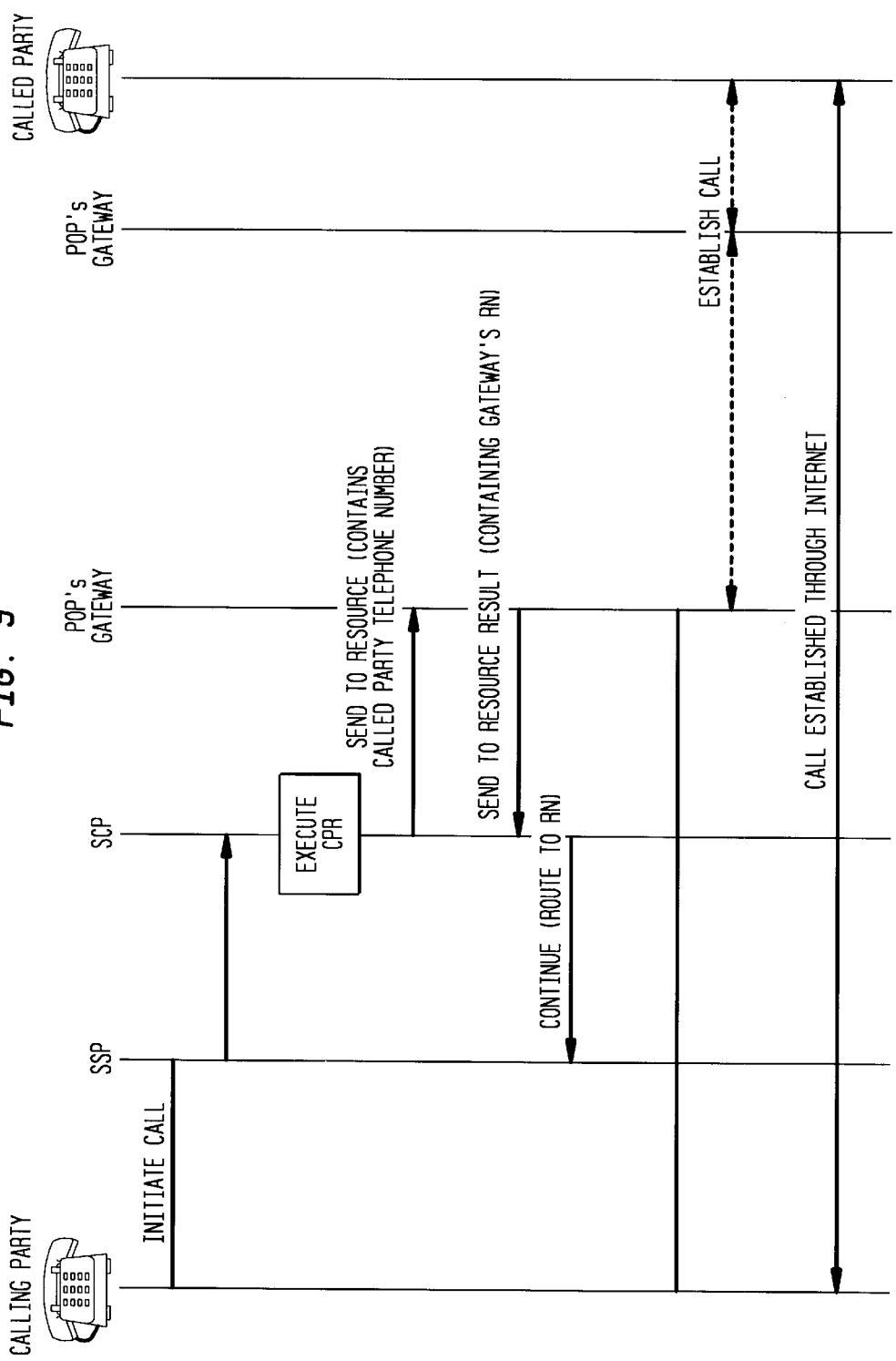

APPARATUS AND METHOD FOR INTERNET TELEPHONY ROUTING

RELATED APPLICATION

This application claims the benefit of U.S. Provisional Application No. 60/044,143 entitled "Internet Telephony Routing Services" filed Apr. 22, 1997 for Darek A. Smyk. The content of this application is incorporated herein by reference.

BACKGROUND OF THE INVENTION

The present invention relates to routing calls in a telephone network, and more particularly to methods and apparatus for routing calls in a network including the Internet.

Internet telephony is two way voice communication over a packet switched network, such as the Internet. FIG. 1 is a diagram of an Internet voice communication network including Internet telephony equipped computers 102 and 110, Internet Service Providers 104 and 108, and the Internet 106. To establish voice communication over the Internet using currently available Internet technology, each participant in a voice call must have a computer equipped for Internet access and special hardware and software supporting Internet voice communication. For example, computers 102 and 110 would require a modem, TCP/IP software, a dialer, a sound card, a microphone, and a speaker to be suitably configured for Internet telephony.

To obtain Internet telephony service using an Internet telephony equipped computer, the parties to a call, computers 102 and 110 connect to an Internet Service Provider providing access to Internet 106. Accordingly, Internet Service Provider account holders paying a flat fee for Internet access can engage in voice communication with one another over the Internet without incremental usage charges. Although the advantage of voice communication using Internet telephony according to current billing methods is the insensitivity of the cost of calls to their duration, there are several drawbacks to this approach. First, each party to Internet telephony voice communication must have a computer and it must be properly equipped for voice communication. Second, computer 110 must be connected to Internet 106 at the time computer 102 initiates a call. Third, many of the Internet telephony software packages are not compatible with other vendors' Internet telephony software. Fourth, the sound quality of Internet telephony calls is generally worse than the sound quality of calls transmitted through the public switched telephone network (PSTN).

To address some of the limitations of providing voice communication through the Internet imposed by using the Internet and telephony-capable computer terminals, some vendors have developed Internet telephony gateways. Internet telephony gateways allow parties that only subscribe to "plain old telephone service" (POTS), but do not have Internet equipped computers and an account with an Internet service provider, to talk to each other through the Internet. FIG. 2 is a network diagram of an Internet telephony service for POTS subscribers. The network of FIG. 2 includes telephone 202, PSTN 204, Internet telephony gateway 206, Internet 214, Internet telephony gateway 216, PSTN 224, and telephone 226.

Internet telephony gateway 206 includes gateway controller (GC) 208, voice translation unit (VTU) 210, and interactive voice response unit (IVR) 212. Internet telephony gateway 216 is similarly configured with GC 218, VTU 220, and IVR 222. A GC performs signaling required for call setup and call tear down between a PSTN and the Internet; accordingly a GC supports both PSTN and Internet signaling protocols. A VTU processes voice signals, which includes packetizing and depacketizing the voice data stream between the PSTN and the Internet. An IVR plays announcements to a calling or called party and collects digits entered using a telephone touch-tone (dual tone multi-frequency (DTMF)) key pad.

To establish an Internet telephony call through the Internet telephony gateway network depicted in FIG. 2, a phone call originator dials from telephone 202 a telephone number assigned to Internet telephony gateway 206 serving PSTN 204. Internet telephony gateway 206 answers the call and connects the caller to IVR 212. Internet telephony gateway 206 interacts with the caller using IVR 212 by playing announcements and collecting digits entered by the caller. Examples of information collected from the caller by IVR 212 include the telephone number of called party at telephone 226, the caller's user identification number, and password. By analyzing the called party's telephone number, Internet telephony gateway 206 determines the network address of Internet telephony gateway 216, which is the Internet telephony gateway providing the least cost path to the called party at telephone 226. Internet telephony gateway 206 then sends a call setup signaling request to Internet telephony gateway 216 using GC 208. Responding to the call setup request, Internet telephony gateway 216 rings telephone 226. When the called party answers telephone 226, an end-to-end communication path is established through the network between telephone 202 and telephone 226. This path includes three segments, a circuit switched path between telephone 202 and PSTN 204, a packet exchange through Internet 214 between Internet telephony gateway 206 and Internet telephony gateway 216, and a circuit switched path between telephone 226 and PSTN 224.

An advantage of using Internet telephony gateways to provide voice communication over the Internet is that such a service is integrated with the calling and called parties' regular telephone service. Neither party requires special computer equipment or an Internet service provider account. Moreover, for one party to place an Internet voice call through the Internet using Internet telephony gateways, both the calling and called party do not have to be logged onto the Internet.

FIG. 3 is a diagram of networks for providing telephone service. Using Internet telephony gateways, telephone service carriers are beginning to offer service that allows callers a choice of voice communication through a circuit switched telephone network 312, an Internet-based packet voice network 314, or through a hybrid network including both a circuit switched telephone network and an Internet-based packet voice network 316. Points of presence (POP) 306, 308, 310, 326, 328, and 330 deployed throughout local PSTN 304 and local PSTN 332 provide access to these networks. Points of presence providing voice communication service through the Internet, i.e., POPs 308, 310, 328, and 330, contain Internet telephony gateways as described in greater detail above.

Because of the cost/performance trade-offs associated with choosing Internet-based voice communication versus circuit switched voice communication, telephone service subscribers want the ability to choose on a call-by-call basis the method of transmission of a voice call. For example, when quality of service is an overriding concern for a given call, the calling party will most likely want the call completed through a circuit switched network. When, on the other hand, price is an overriding factor, the calling party would select an Internet-based telephone service provider.

Not only should a caller be able to select between Internet service and circuit switched service, but a caller should also be able to choose among several Internet-based voice communication service providers having different rate structures and having POPs closest to the called party.

Accordingly, it is an object of the invention to provide an Internet telephony routing capability that allows intelligent routing of telephone calls through Internet-based voice communication service providers when such routing conforms with caller preferences.

As previously described, the current state of the art in Internet telephony requires a phone call originator to dial a telephone number associated with the Internet Telephony gateway and subsequently interact with the gateway to enter the caller's account number and identification number, as well as, the called party's telephone number. This dialing procedure corresponds to the dialing procedure used for making PSTN phone calls using calling cards or debit cards. It is also an object of the invention to provide Internet Telephony users with the ease of use that is currently enjoyed by POTS users and allow a telephone service subscriber to take advantage of Internet telephony without changing their current behavior. It is an object of the invention to allow a caller to make an Internet phone call by using a phone connected to POTS and, unless the calling party is dialing from a remote phone, dialing the called party's phone number without dialing additional access codes or having to respond to prompts.

DESCRIPTION OF THE INVENTION

To achieve these and other advantages and in accordance with the purposes of the invention, as embodied and broadly described, the invention includes an efficient method for automatically designating a telephone call route through a telephone network including a circuit switched telephone network (STN) and a packet switched network, such as the Internet. The method includes the steps, executed by a network element, such as a service control point (SCP), of receiving a telephone number corresponding to a called party receiving the telephone call, reviewing preference information pertaining to a calling party's telephone service, determining from the preference information and the telephone number whether the telephone call can be routed to the called party through the Internet, and assigning a route for the telephone call through one of either the Internet or the STN to the called party based on whether the call is routable through the Internet.

The invention also comprises a network element, such as an SCP, for automatically designating a telephone call route through a telephone network including an STN and the Internet. The network element includes structure for receiving a telephone number corresponding to a called party receiving the telephone call, structure for reviewing preference information pertaining to a calling party's telephone service, structure for determining from said preference information and said telephone number whether said telephone call can be routed to said called party through said Internet, and structure for assigning a route for the telephone call through one of either the Internet or the STN to the called party based on whether the call is routable through the Internet.

It is to be understood that both the foregoing general description and the following detailed description are exemplary and explanatory and are intended to provide further explanation of the invention as claimed.

BRIEF DESCRIPTION OF THE DRAWINGS

The accompanying drawings provide a further understanding of the invention. They illustrate embodiments of the invention and, together with the description, explain the principles of the invention.

FIG. 9 is a call flow diagram of the sequence of steps shown in FIG. 8.

BEST MODE FOR CARRYING OUT THE INVENTION

Reference will now be made in detail to the construction and operation of preferred implementations of the present invention which are illustrated in the accompanying drawings.

The following description of the preferred implementations of the present invention is only exemplary of the invention. The present invention is not limited to these implementations, but may be realized by other implementations.

Figure 1:
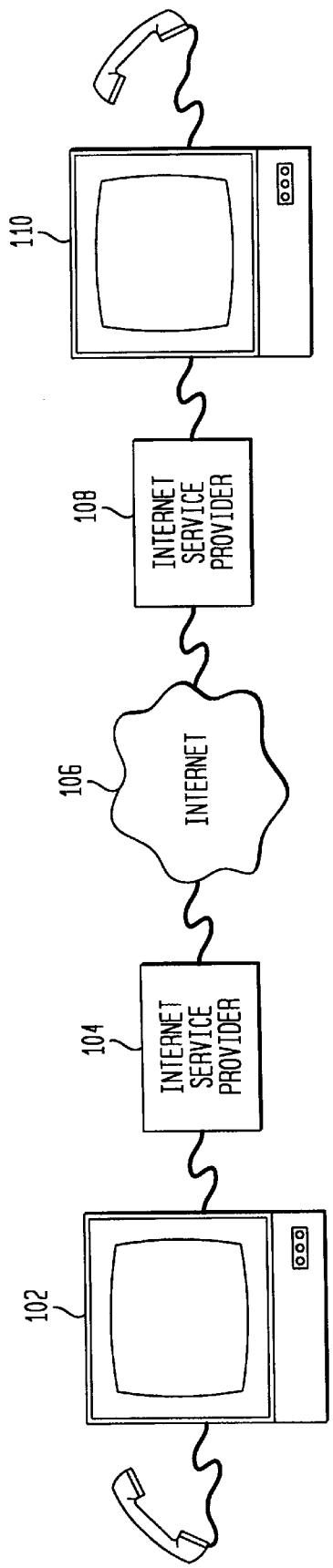
FIG. 1 is a block diagram of a telecommunication network supporting Internet voice communication.
Figure 2:
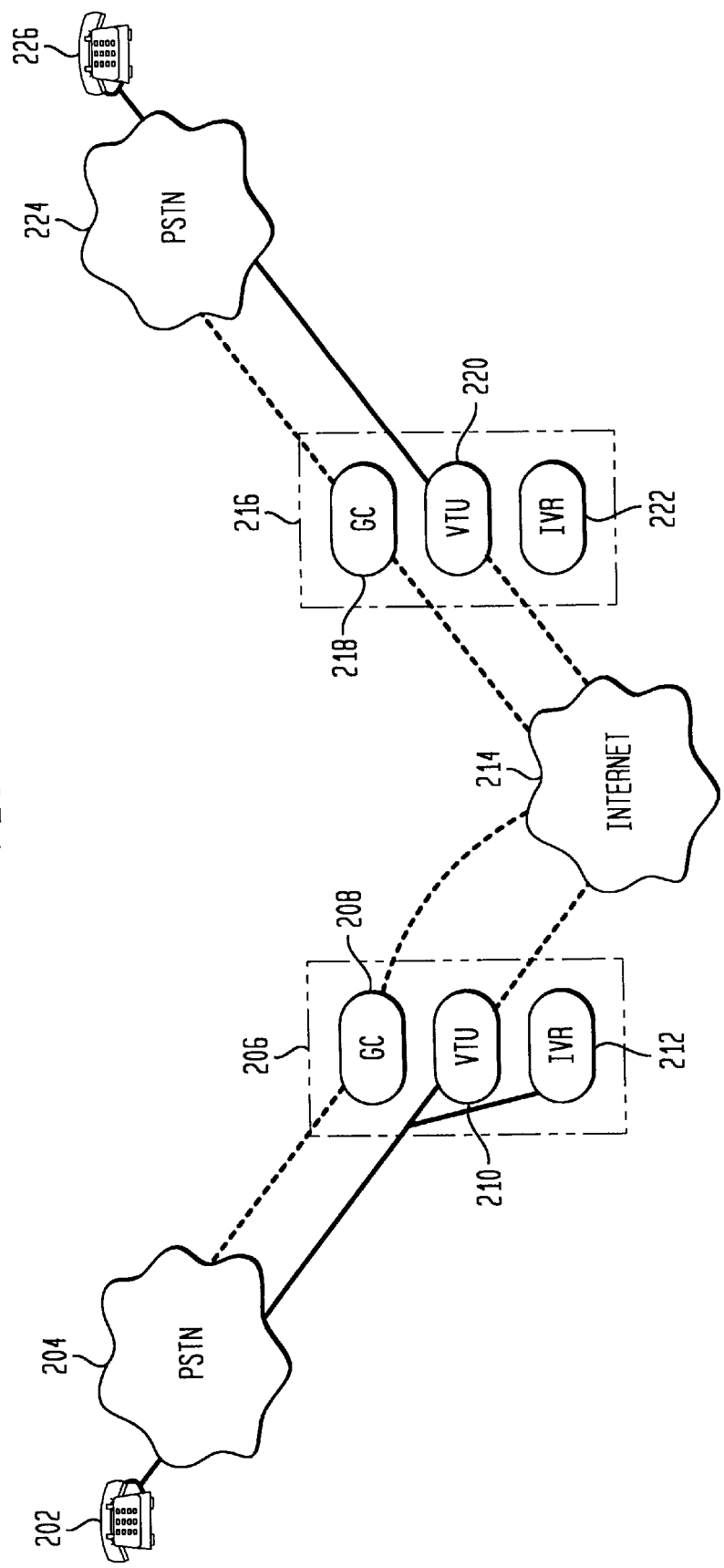
FIG. 2 is a block diagram of a telecommunication network supporting internet voice communication using Internet telephony gateways.
Figure 3:
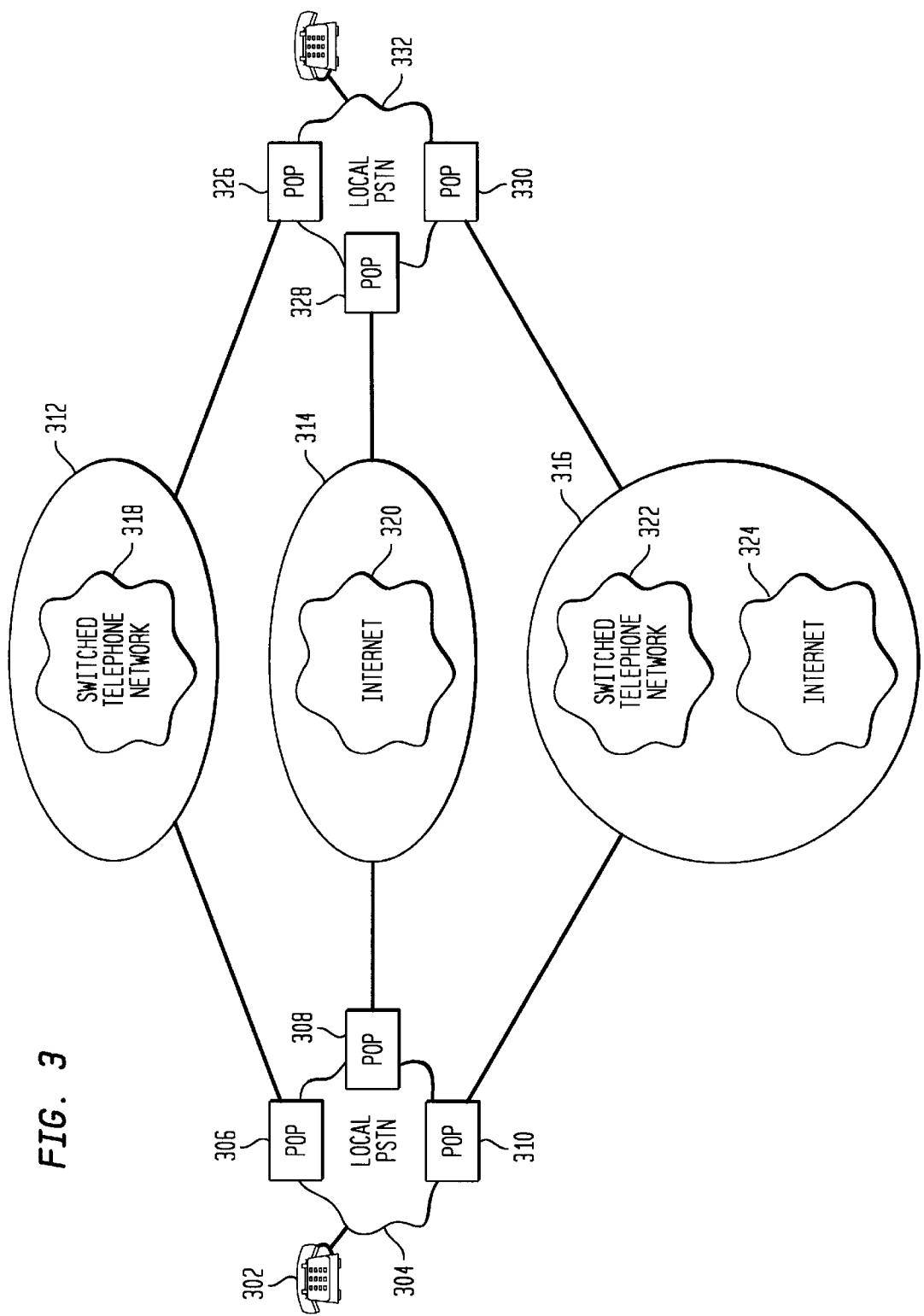
FIG. 3 is a block diagram of a telecommunication network supporting Internet voice communication with multiple points of presence in the local public switched telephone network.
Figure 4:
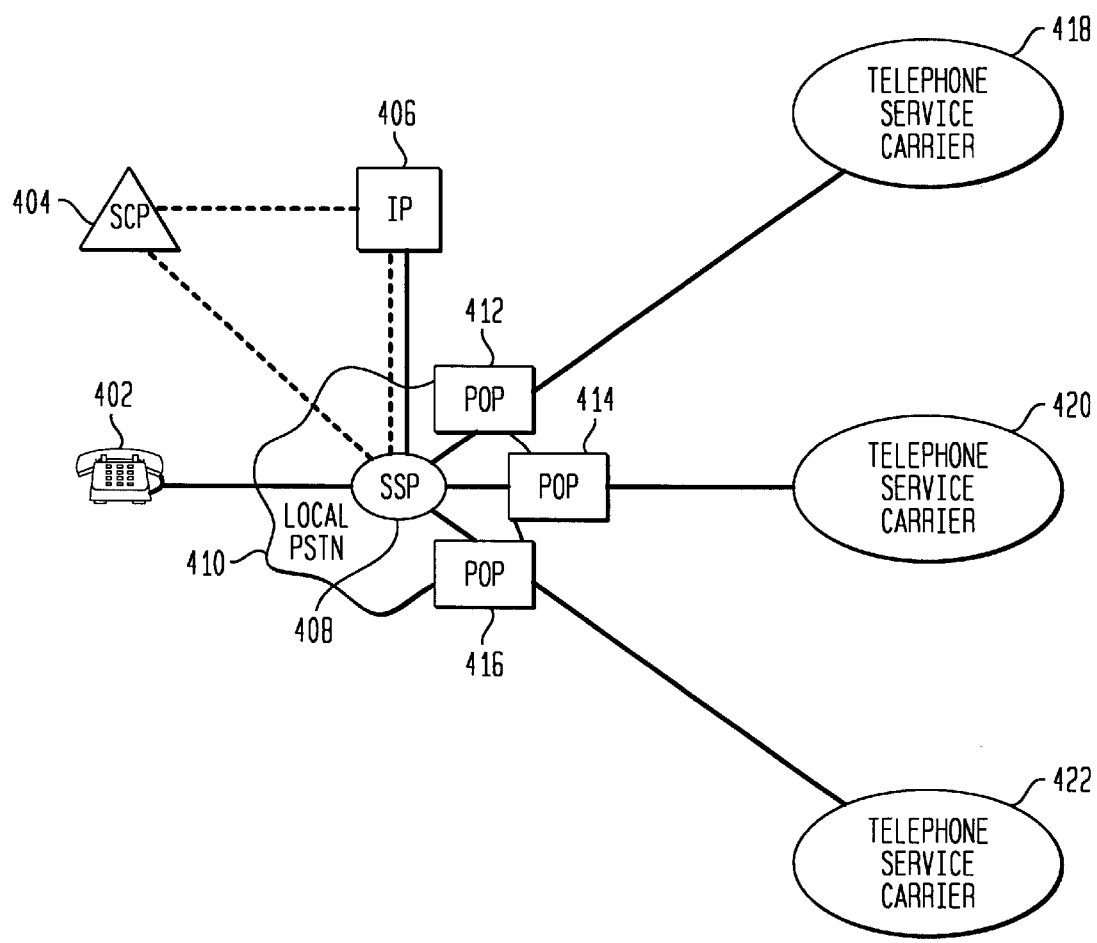
FIG. 4 is a block diagram of a telecommunication network supporting Internet voice communication using a service control point in accordance with one embodiment of the present invention.

The present invention can be implemented in a variety of telecommunication networks including, for example, a telephone network as depicted in the block diagram of FIG. 4. As shown in FIG. 4, local PSTN 410 includes POPs 412, 414, and 416, and signal switching point (SSP) 408. Points of presence 412, 414, and 416 connect local PSTN 410 to telephone service carriers 418, 420, and 422, respectively. The network depicted in the block diagram of FIG. 4 also includes SCP 404, intelligent peripheral (IP) 406, and calling party telephone 402.

Figure 5:
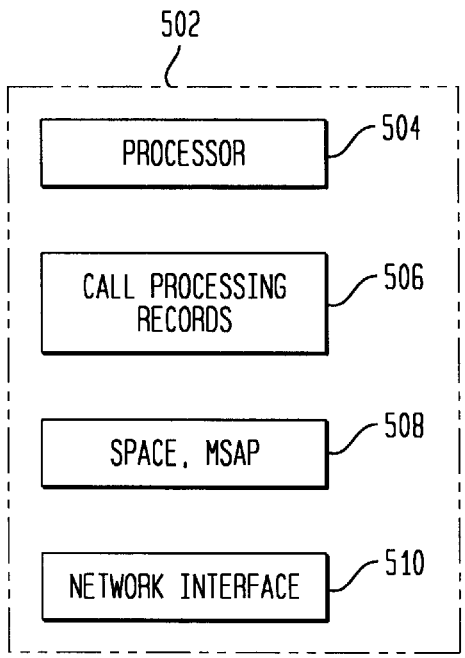
FIG. 5 is a block diagram of an embodiment of a service control point in accordance with one embodiment of the present invention.
Figure 6A:
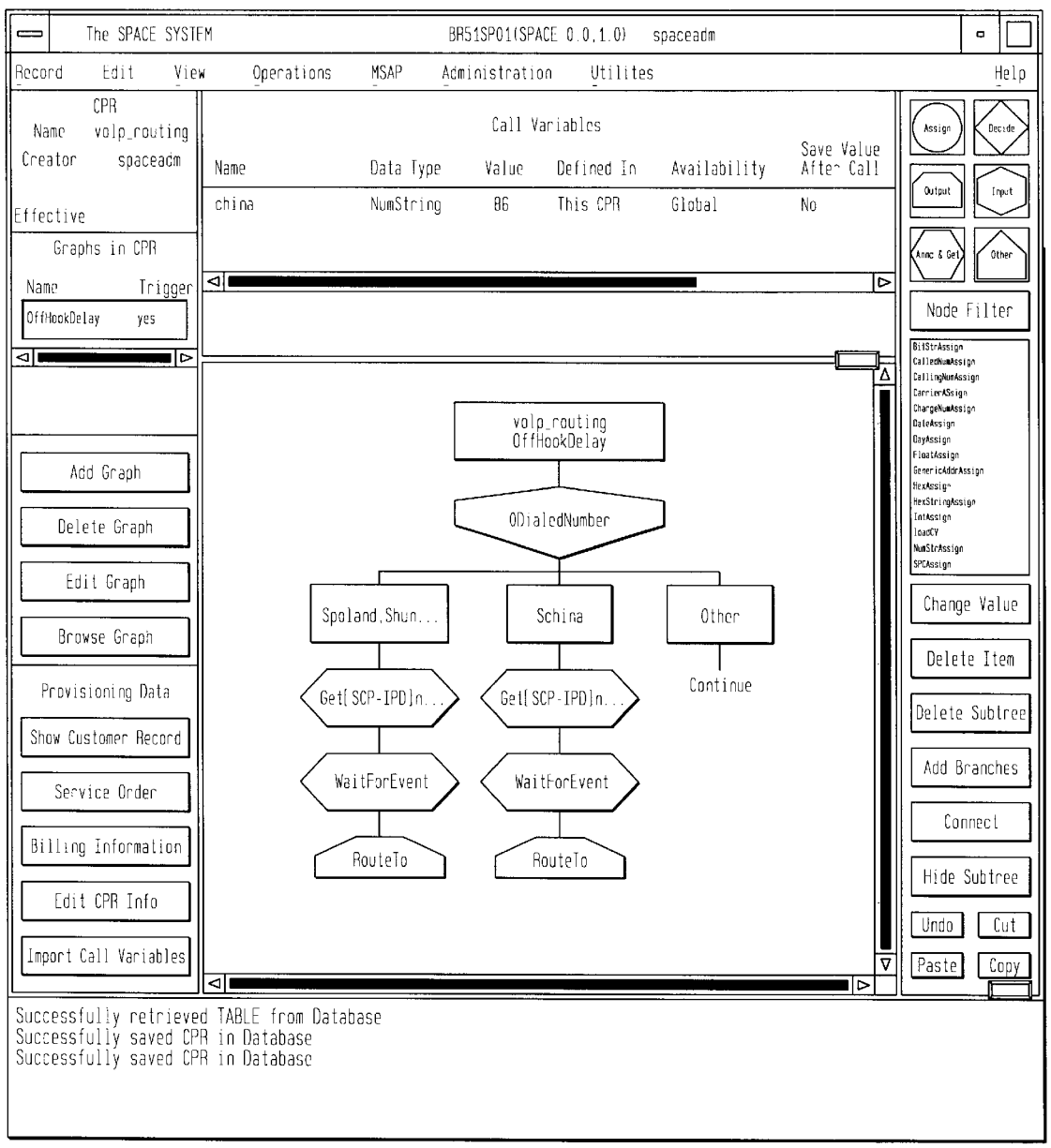
FIGS. 6a and 6b are call processing records in accordance with alternative embodiments of the present invention.
Figure 6B:
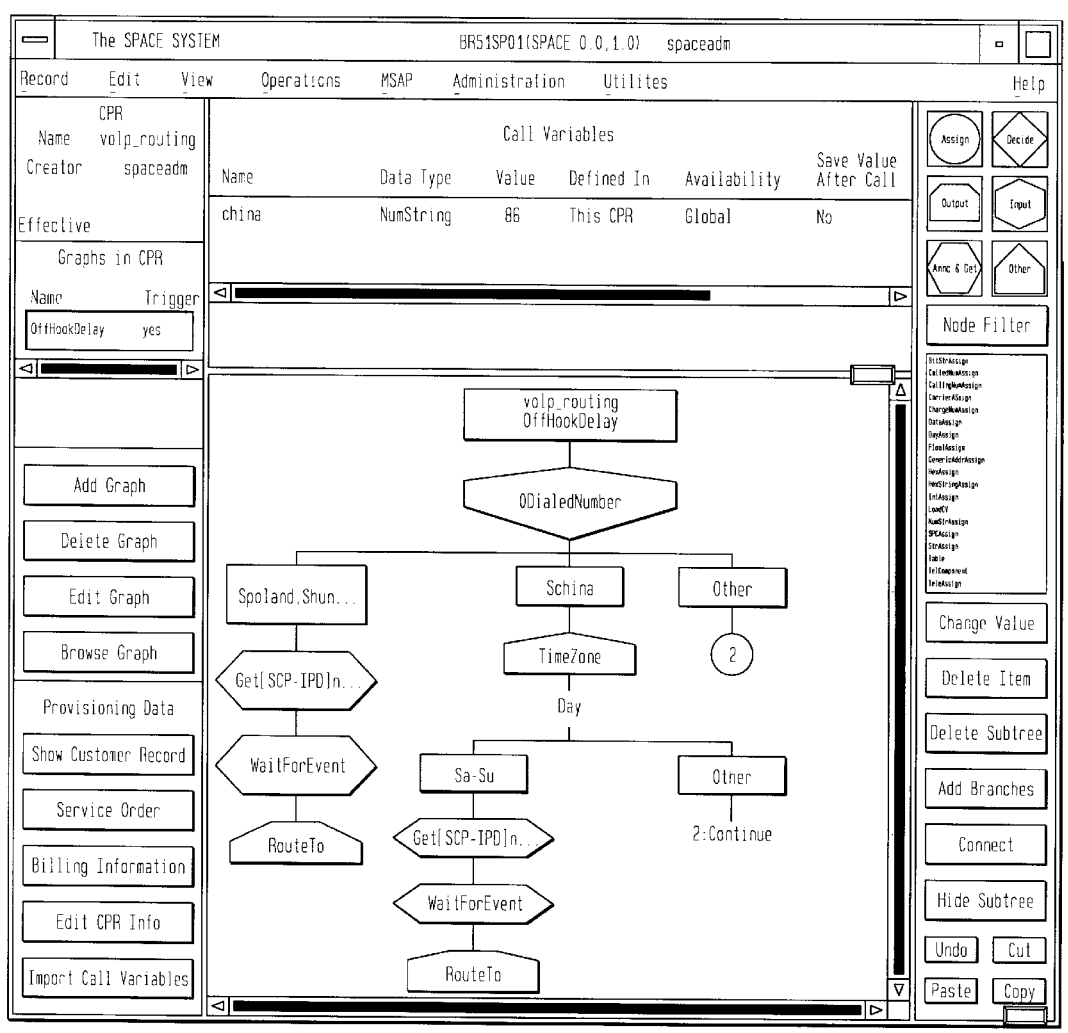

An embodiment of the network element of the present invention, service control point 502, shown in the block diagram of FIG. 5, provides automatic Internet telephony routing. The apparatus of FIG. 5 includes processor 504, call processing records 506, SPACE® and MSAP™ applications 508, and network interface 510. Service control point 502 preferably comprises Telcordia's Techhnologies, Inc.'s (Telcordia) Intelligent Network Service Control Point (ISCP) running Telcordia's proprietary SPACE® and MSA™ applications. The SPACE® application is a telephone service application creation computer program that creates call processing records 506. The MSA™ application is a computer program that executes on processor 504. The MSA™ application is interprets and executes call processing records 506, such as the call processing records depicted in FIGS. 6a and 6b, and assigns routes to telephone calls. Service control point 502 communicates with other network elements through network interface 510.

Service control point 404 provides routing control information to SSP 408 designating a route to a called party telephone. Preferably, the route designated by SCP 404 will traverse telephone service carriers 418, 420, or 422. Service control point 404 selects a route based on considerations such as the calling party's default telephone service carrier, whether the calling party selects a specific telephone service carrier for a given call, or which route will provide the best cost-quality balance.

In the case where a caller uses a telephone that has not been registered with an Internet telephony routing service, service control point 404 can cause IP 406 to play announcements and collect DTMF digits keyed by the caller to gather additional information for making call routing decisions. For example, the calling party may be prompted to select a telephone service carrier, from a pre-approved list. Pre-approval could be based on the telephone service carrie's quality of service, approval of the calling party's credit, or the reputation of the telephone service carrier. Service control point 404 also automatically determines which telephone service carriers serve both the calling party and the called party, computes the billing rate for the call, and queries the calling party for approval of the billing rate before establishing the call. To verify the calling party's authorization to access a telephone service carrier's network, SCP 404 causes IP 406 to prompt the calling party for an identification number or PIN, or SCP 404 checks an automatic number identifier (ANI) for the call.

More specifically a telephone user who subscribes to an Internet routing telephone service in accordance with my invention will establish as part of the call processing record 506 a customer profile that includes the following routing instructions: (1) for all domestic calls use the subscriber's pre-selected circuit switched telephone network long distance carrier (e.g., MCI); (2) for international calls use one of the pre-selected internet-based carriers in order of preference; and (3) for international calls that can not be handled according to rule (2) use a pre-selected default circuit switched telephone network long distance carrier.

Figure 7:
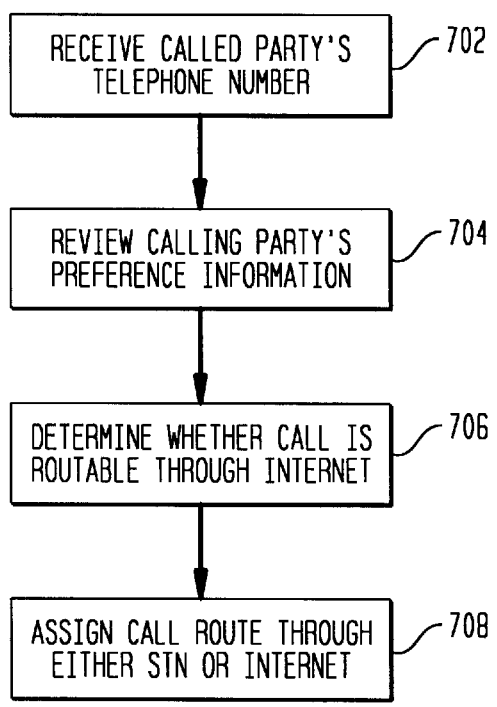
FIG. 7 is a process flow diagram of a method for routing a telephone call in a telecommunication network including the Internet and a switched telephone network in accordance with one embodiment of the present invention.

FIG. 7 is a flow diagram of a typical sequence of steps executed by SCP 404 to automatically designate a route through a telephone network to a called party. Service control point 404 receives a telephone number dialed from telephone 402 (step 702). Service control point 404 preferably reviews preference information established for the calling party's telephone service (step 704). This preference information can take the form, for example, of a customer profile for calls originated from telephone 402 indicating a default carrier for all domestic calls and a default carrier for international calls that cannot be routed through a telephone service carrier providing Internet voice communication. Such a profile can also include a ranked list of telephone service carriers providing Internet voice communication, where SCP 404 will select the highest ranking telephone service carrier having a POP at both the caller's local PSTN and the called party's local PSTN. By prompting the caller for information, IP 406 can obtain additional preference information from the caller for SCP 404 to use for routing decisions. The profiles are preferably established when a telephone service subscriber registers for an Internet telephony routing service.

After reviewing the calling party's preference information, SCP 404 analyzes the dialed number and preference information to determine whether the telephone call can be routed to the called party through a telephone service carrier providing Internet voice communication (step 706). For example, if the caller places a long distance domestic call, SCP 404 routes the call to the called party through the default domestic long distance STN telephone service carrier specified in the calling party's profile. If the caller dials an international number, SCI 404 scans a list of pre-selected telephone service carriers providing Internet voice communication to find a carrier with a POP serving the called party. If SCP 404 finds a telephone service carrier with a suitable POP, it routes the call through that carrier. If, however, SCP 404 cannot find a telephone service carrier supporting Internet voice communication with a suitable POP, SCP 404 will assign a route to the call consistent with a default STN carrier designated in the calling party's profile. Once SCP 404 assigns a route to the call through either a telephone service carrier with a network for providing Internet voice communication or through a telephone service carrier with an STN (step 708), SSP 408 completes the call through the telephone service carrier network designated in the assigned route.

Figure 8:
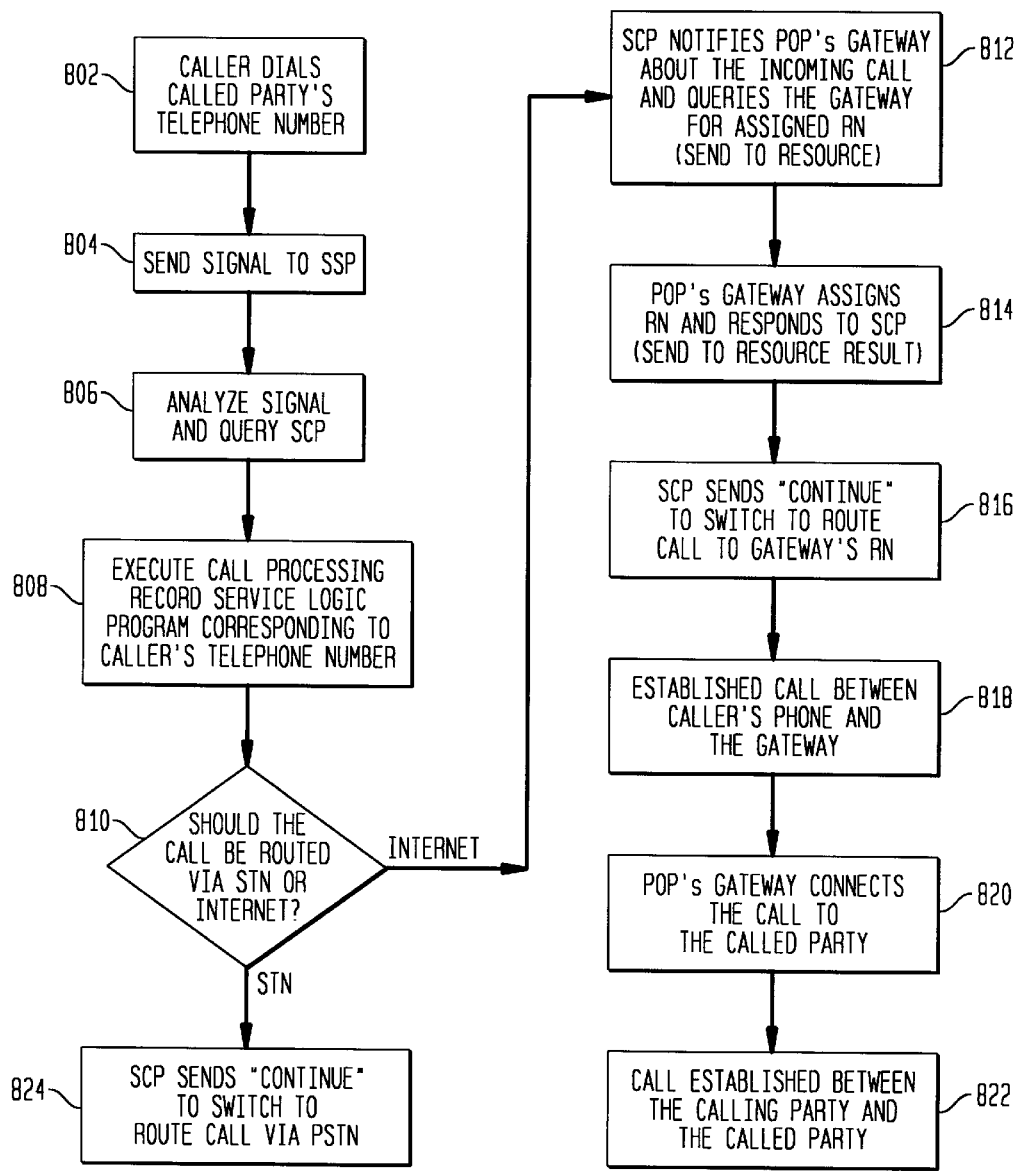
FIG. 8 is a process flow diagram of a method for routing a telephone call in a telecommunication network including the Internet and a switched telephone network in accordance with another embodiment of the present invention.

FIG. 8 is a flow diagram of another embodiment of a call routing method according to the present invention. FIG. 9 is a call flow diagram of the sequence of steps shown in FIG. 8. Referring to FIG. 8, the caller dials the telephone number of the called party (step 802) and the telephone sends a signal to an SSP serving the caller (step 804). The SSP analyzes the signal from the telephone and queries an SCP (step 806). Then the SCP executes a service logic program designated by a call processing record corresponding to the caller's telephone number (step 808). The SCP determines whether the call should be routed via an STN or via the Internet (step 810).

If the call is determined routable through the Internet, the SCP notifies the gateway at the corresponding POP about the incoming call and queries the gateway for a routing number (RN) (step 812). The gateway responds to the SCP query by assigning an RN (step 814). The SCP sends a "continue" signal to the SSP serving the caller causing it to route the call to the RN specified by the gateway (step 816). A call is established between the caller's telephone and the gateway (step 818). The gateway then connects the call to the called party (step 820) thus completing the end-to-end telephone connection between the calling and called party (step 822) through the Internet.

If at step 810 the SCP determines that the call should be routed through the STN, the SCP sends a "continue" signal to the SSP serving the caller to route the call via the STN (step 824).

In another embodiment of the present invention, SCP 404 assigns a priority to routing a telephone call through a telephone service carrier providing Internet voice communication if the calling party's preference information includes an override feature code. There may be some types of calls, for example certain domestic calls, where a calling party is willing to sacrifice voice quality to gain cost savings. For these calls, the calling party has the option of entering an override feature code, for example "*13," from the keypad of telephone 402. The override code can be entered either in sequence with the dialed number or in response to a query from IP 406. The effect of inputting this override code is that default preference information contained in the calling party's profile, in this case, the preference for using an STN telephone service carrier for domestic calls, will be superseded for the active call only and priority given to routing the call through the Internet.

In another embodiment of the present invention, SCP 404 automatically designates a telephone call route through a telephone network including an STN and the Internet for calls placed from telephones that have not been registered for use with an Internet telephony routing service. This embodiment allows callers that are away from their home or office to place calls from telephones that are not registered with an Internet telephony routing service, but still have the ability to have calls routed by SCP 404 through telephone service providers with Internet voice communication capability. A caller accessing SCP 404's routing capability from a telephone that is not registered, preferably dials an access telephone number associated with an Internet telephony routing service. Service control point 404 causes IP 406 to query the caller for an identification number or PIN and verifies that the caller is authorized for the service. Intelligent peripheral 406 then prompts the caller for and collects the telephone number of the called party. From this point on, SCP 404 processes the dialed number and assigns a route to the call just as if the call had been placed from the caller's registered telephone.

While there has been illustrated and described what are at present considered to be preferred embodiments and methods of the present invention, it will be understood by those skilled in the art that various changes and modifications may be made, and equivalents may be substituted for elements thereof without departing from the true scope of the invention. For example, while the invention has been described in the context of Internet telephony, the invention can be applied to any packet network supporting telephone communication. Thus, embodiments consistent with the present invention could be applied to intranet packet networks.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

I claim:

1. A method for enabling a telephone subscriber to initiate a telephone call to a called party either from the subscriber's registered telephone or a non-registered telephone and through a telephone network comprising a plurality of circuit switched networks and a plurality of packet switched networks, said method comprising the steps of:

storing in a telephone network a subscriber profile indicating for each international call made by the subscriber a preferred one of said packet switched networks that the call is to be routed through and a preference ranking of packet switched networks if the call cannot be routed through the preferred one of said packet switched networks and further indicating for each domestic call made by the subscriber a pre-selected one of the circuit switched networks that the call is to be routed through, determining by the telephone network, based on the subscriber profile, how the call is to be routed, said determining step including computing a billing rate for the call if the call is from a non-registered telephone and querying the subscriber for approval, and establishing the connection by the telephone network to the called party in accordance with the determining step.

2. The method in accordance with claim 1 wherein said establishing step further comprises establishing the connection for an international call through the pre-selected circuit switched network if none of the packet switched networks identified in the subscriber profile serves the called party.

3. A telephone communications system for a telecommunications network, said network comprising a plurality of circuit switched telephone networks and a plurality of packet switched telephone network, said system comprising:

means for maintaining a subscriber profile that determines that all calls of a first class made by the subscriber are to be sent over one of said packet switched networks chosen from among a list of pre-selected packet switched networks ordered in a preference ranking, and that further determines that calls made by the subscriber and not of said first class are to be sent over a pre-selected one of the circuit switched networks, means for receiving a called party's telephone number generated by the subscriber, means for analyzing the called number and the subscriber profile to determine whether a connection to the called number can be routed over one of the pre-selected packet networks in accordance with the preference ranking specified by the subscriber profile, said means for analyzing computing a billing rate for the connection and querying the subscriber for approval if the connection is to be made from other than a registered telephone of the subscriber, and means for establishing the connection to the called party over one of the pre-selected packet switched networks if the called number is of the first class and the analyzing means determines the connection can be routed over one of the pre-selected packet switched networks and for establishing the connection over a pre-selected circuit switched network if the called number is not of the first class.

4. The telephone communications system of claim 3 wherein if the called number is of the first class and the analyzing means determines the connection cannot be routed over one of the pre-selected packet switched networks, said establishing means establishes the connection over the pre-selected circuit switched network.

5. The telephone communications system of claim 3 further comprising a gateway associated with each of said packet switched networks, and wherein said connection establishing means further includes means for communicating with a gateway to establish the connection to the called party through a packet switched network.

6. A telephone communications system for a telecommunications network, said network comprising a plurality of circuit switched telephone networks and a plurality of packet switched network, said system comprising:

means for maintaining a subscriber profile that determines that all calls of a first class made by the subscriber are to be sent over one of said packet switched networks chosen from among a list of pre-selected packet switched networks ordered in a preference ranking, and that further determines that calls made by the subscriber and not of said first class are to be sent over a pre-selected one of the circuit switched networks, means for receiving a called party's telephone number generated by the subscriber wherein said telephone number is intercepted by the telecommunications network and then forwarded by the telecommunications network to said receiving means, means for analyzing the called number and the subscriber profile to determine whether a connection to the called number can be routed over one of the pre-selected packet networks in accordance with the preference ranking specified by the subscriber profile, and means for establishing the connection to the called party over one of the pre-selected packet switched networks if the called number is of the first class and the analyzing means determines the connection can be routed over one of the pre-selected packet switched network and for establishing the connection over a pre-selected circuit switched network if the called number is not of the first class.

* * * * *

UNITED STATES PATENT AND TRADEMARK OFFICE
CERTIFICATE OF CORRECTION

PATENT NO. : 6,597,686 B1
DATED : July 22, 2003
INVENTOR(S) : Darek A. Smyk

It is certified that error appears in the above-identified patent and that said Letters Patent is hereby corrected as shown below:

Column 8,
Lines 7 and 51, change "network" to -- networks --.

Column 10,
Line 2, change "network" to -- networks --.

Signed and Sealed this

Twenty-fifth Day of October, 2005

JON W. DUDAS
*Director of the United States Patent and Trademark Office*